United States Patent
Ihara

(10) Patent No.: US 11,479,469 B2
(45) Date of Patent: Oct. 25, 2022

(54) METHOD FOR STORING A NANOCARBON DISPERSION LIQUID

(71) Applicant: NEC CORPORATION, Tokyo (JP)

(72) Inventor: Kazuki Ihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 17/040,315

(22) PCT Filed: Mar. 23, 2018

(86) PCT No.: PCT/JP2018/011870
§ 371 (c)(1),
(2) Date: Sep. 22, 2020

(87) PCT Pub. No.: WO2019/180956
PCT Pub. Date: Sep. 26, 2019

(65) Prior Publication Data
US 2021/0087061 A1 Mar. 25, 2021

(51) Int. Cl.
*C01B 32/174* (2017.01)
*B82Y 40/00* (2011.01)

(52) U.S. Cl.
CPC ............ *C01B 32/174* (2017.08); *B82Y 40/00* (2013.01); *C01B 2202/02* (2013.01)

(58) Field of Classification Search
CPC ... C01B 32/174; C01B 2202/02; C01B 32/15; C01B 32/158; C01B 32/159; C01B 32/16; C01B 32/162; C01B 32/164; C01B 32/166; C01B 32/168; C01B 32/17; C01B 32/172; C01B 32/176; C01B 32/178; C01B 2202/00; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 40/00; D01F 9/12; D01F 9/127; D01F 9/1271; D01F 9/1272; D01F 9/1273; D01F 9/1274;
(Continued)

(56) References Cited

FOREIGN PATENT DOCUMENTS

| JP | 2004-534714 A | 11/2004 |
|----|---------------|---------|
| JP | 2007-169120 A | 7/2007 |

(Continued)

OTHER PUBLICATIONS

Aladag, et al., Experimental investigations of the viscosity of nanofluids at low temperatures, Applied Energy 2012; 97: 876-880 (Year: 2012).*

(Continued)

*Primary Examiner* — Daniel C. McCracken
(74) *Attorney, Agent, or Firm* — Sughrue Mion, PLLC

(57) ABSTRACT

Provided is a method for stably storing a nanocarbon dispersion liquid comprising a surfactant for a long period of time. One aspect of the present invention relates to a method for storing a nanocarbon dispersion liquid comprising a low-temperature storage step of storing the nanocarbon dispersion liquid at 10° C. or lower and/or a surfactant concentration adjustment step of adjusting a concentration of the surfactant in the nanocarbon dispersion liquid so as to be less than 100 times of a critical micelle concentration and equal to or more than the critical micelle concentration.

10 Claims, 1 Drawing Sheet

(58) Field of Classification Search
CPC .... D01F 9/1275; D01F 9/1276; D01F 9/1277; D01F 9/1278; D01F 9/133
See application file for complete search history.

(56) References Cited

FOREIGN PATENT DOCUMENTS

| | | | | |
|---|---|---|---|---|
| JP | 2007-254212 | * | 10/2007 | ............... B82B 1/00 |
| JP | 2007-254212 A | | 10/2007 | |
| JP | 2011-168417 A | | 9/2011 | |
| JP | 2012-144426 A | | 8/2012 | |
| JP | 2012-218992 A | | 11/2012 | |
| JP | 5169277 B2 | | 3/2013 | |
| JP | 5717233 B2 | | 5/2015 | |
| JP | 2017-001919 | * | 1/2017 | ........... C01B 32/152 |
| JP | 2017-001919 A | | 1/2017 | |

OTHER PUBLICATIONS

Machine Translation of JP 2017-001919 to NEC Corp. (Year: 2017).*
Machine Translation of JP 2007-254212 to NOF Corp. (Year: 2007).*
International Search Report for PCT/JP/2018/011870, dated May 1, 2018.
Japanese Office Action for JP Application No. 2020-507278 dated Mar. 1, 2022 with English Translation.

* cited by examiner

Dispersion liquid B storage at 20 °C for 6 months

Dispersion liquid B storage at 5 °C for 6 months

Dispersion liquid C storage at 5 °C for 6 months

METHOD FOR STORING A NANOCARBON DISPERSION LIQUID

CROSS REFERENCE TO RELATED APPLICATIONS

This application is a National Stage of International Application No. PCT/JP2018/011870 filed Mar. 23, 2018.

TECHNICAL FIELD

The present invention relates to a method for storing a nanocarbon dispersion liquid.

BACKGROUND ART

In recent years, carbon materials having a size in a nanometer range, so-called nanocarbon materials, are expected to be applied to various fields due to their mechanical properties, electrical properties, and chemical properties. As one of the nanocarbon materials, a carbon nanotube is exemplified. Carbon nanotubes are cylindrical substances composed of carbon atoms. Among the carbon nanotubes, the one having a single cylindrical layer is called a single-walled carbon nanotube.

Single-walled carbon nanotubes are materials having excellent electrical properties and are expected as next-generation electronic materials. It has been known that the single-walled carbon nanotubes are classified into two different properties, i.e., those having metallic properties and those having semiconducting properties, in accordance with a diameter and a winding manner of tubes. When single-walled carbon nanotubes are synthesized by known manufacturing methods, a single-walled carbon nanotube mixture comprising single-walled carbon nanotubes having metallic properties (hereinafter referred to as "metallic single-walled carbon nanotubes") and single-walled carbon nanotubes having semiconducting properties (hereinafter referred to as "semiconducting single-walled carbon nanotubes") in a statistical ratio of 1:2 is obtained.

On the other hand, in the field of semiconductor devices, a thin film transistor (TFT) using amorphous or polycrystalline silicon as a semiconductor film has been known. The TFT has been put to practical use as a switching element for an active matrix liquid crystal display or the like.

In recent years, thin films comprising single-walled carbon nanotubes have been investigated as semiconductor films for TFTs. A TFT comprising a single-walled carbon nanotube has an advantage that it can be manufactured at a low temperature as compared with a TFT comprising an amorphous or polycrystalline silicon. Therefore, the use of single-walled carbon nanotubes makes it possible to form a circuit on the plastic substrate, and thus many advantageous effects such as reducing the weight and cost of the semiconductor device have been expected.

In recent years, a method of constructing an electronic part such as a semiconductor device by a printing method in which an electronic material is applied to a substrate such as a plastic (i.e. printing electronics) has been used, and thereby the electronic parts having a large-area is manufactured at a low cost. For this printing, a printing ink in which a metallic or a semiconducting material is uniformly dispersed is used. As such printing ink, a nanocarbon dispersion liquid in which a nanocarbon material such as a single-walled carbon nanotube is uniformly dispersed in a solution has been studied.

However, as described above, the single-walled carbon nanotubes manufactured by the known manufacturing method comprises the metallic single-walled carbon nanotubes and the semiconducting single-walled carbon nanotubes in a ratio of about 1:2. Therefore, the use of the mixture of single-walled carbon nanotubes as a semiconductor channel material may occur problems such as deterioration of electrical characteristics. For example, when a single-walled carbon nanotube is used as a channel material for a TFT, performance deterioration such as short circuit and deterioration of On/Off performance occurs due to the metallic single-walled carbon nanotube.

In order to solve such a problem of performance deterioration, a method of separating the metallic single-walled carbon nanotubes and the semiconducting single-walled carbon nanotubes has been proposed. As one of the separation methods, for example, single-walled carbon nanotubes are dispersed in a solution containing a nonionic surfactant, and a direct-current voltage is applied to the dispersion liquid in the vertical direction to form two or more groups of single-walled carbon nanotube dispersion liquid layers having different properties (see, for example, Patent Document 1). This method makes it possible to obtain a good semiconducting single-walled carbon nanotube dispersion liquid that contains no ionic species, which may deteriorate the properties of TFT during manufacturing the TFT, such as sodium. Such dispersion liquids can be used as printing inks in printing electronics.

CITATION LIST

Patent Document

Patent Document 1: Japanese Patent No. 5717233

SUMMARY OF INVENTION

Technical Problem

However, when the nanocarbon dispersion liquid (including the dispersion liquid obtained by after separating into metallic-type and semiconducting-type single-walled carbon nanotubes) prepared by uniformly dispersing the nanocarbon into the solution is stored at a room temperature for a long time, there has been a problem that the nanocarbon material and the surfactant are aggregated and a white turbidity is generated, resulting in nonuniformity in the solution.

An object of the present invention is to provide a method for stably storing a nanocarbon dispersion liquid comprising a surfactant for a long period of time.

Solution to Problem

One aspect of the present example embodiment relates to a method for storing a nanocarbon dispersion liquid comprising a nanocarbon material and a surfactant, comprising a low-temperature storage step of storing the nanocarbon dispersion liquid at 10° C. or lower.

Another aspect of the present example embodiment relates to a method for storing a nanocarbon dispersion liquid comprising a nanocarbon material and a surfactant, comprising a surfactant concentration adjustment step of adjusting a concentration of the surfactant in the nanocarbon dispersion liquid so as to be less than 100 times of a critical micelle concentration and equal to or more than the critical micelle concentration.

Another aspect of the present example embodiment relates to a method for storing a nanocarbon dispersion liquid comprising a nanocarbon material and a surfactant, comprising a surfactant concentration adjustment step of adjusting a concentration of the surfactant in the nanocarbon dispersion liquid so as to be less than 100 times of a critical micelle concentration and equal to or more than the critical micelle concentration and a low-temperature storage step of storing the nanocarbon dispersion liquid at 10° C. or lower.

Advantageous Effect of Invention

According to the present invention, a method for stably storing a nanocarbon dispersion liquid for a long period of time can be provided.

DESCRIPTION OF EXAMPLE EMBODIMENTS

Figure 1:
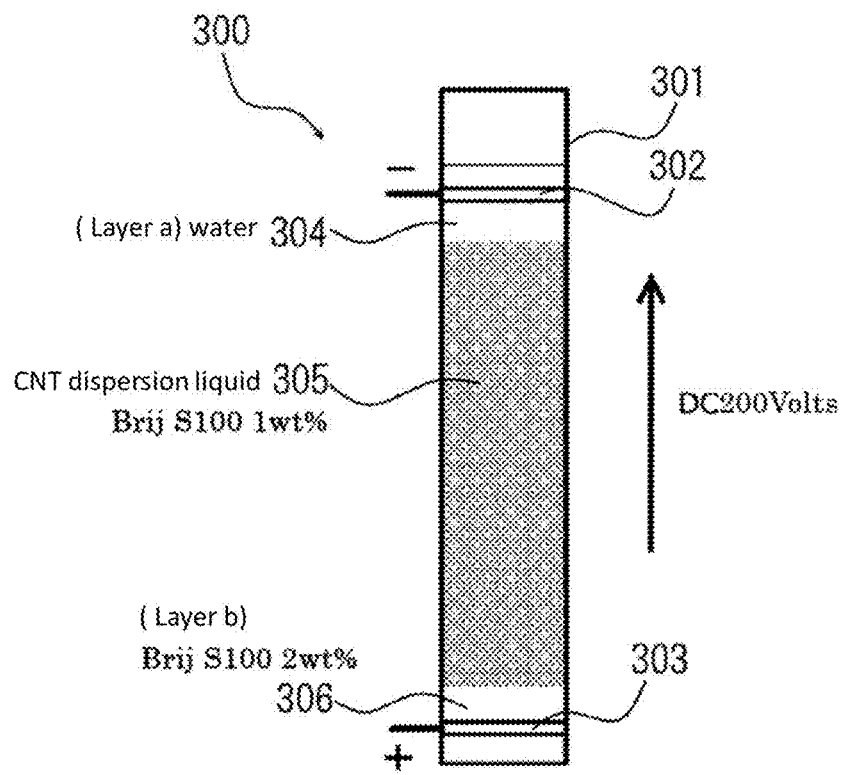
FIG. 1 is a schematic view showing a structure of a separation apparatus used in the Example.

One aspect of the present example embodiment is a method for storing a nanocarbon dispersion liquid comprising a nanocarbon material and a surfactant, comprising a step of storing the nanocarbon dispersion liquid at a low temperature (preferably at 10° C. or lower) and/or a step of adjusting a concentration of the surfactant in the nanocarbon dispersion liquid so as to be less than 100 times of a critical micelle concentration and equal to or more than the critical micelle concentration. According to the method for storing a nanocarbon dispersion liquid of the present example embodiment, even when the period for storing the nanocarbon dispersion liquid is long, a generation of white turbidity (becoming cloudy) can be prevented and thus a stable state can be maintained. Further, an increase in electrical conductivity of the dispersion liquid of the semiconducting nanocarbon material can be suppressed. According to the storage method of the present example embodiment, the storage period is not particularly limited, but, for example, even when the storage period is preferably 3 months or more, and more preferably 6 months or more, the nanocarbon dispersion liquid can maintain a stable state without generation of white turbidity.

The "storage" of the present example embodiment is not limited to storage in a stationary state, and also includes transportation. Here, "transportation" means moving a container comprising the nanocarbon dispersion liquid, and a transportation means may be used. Examples of the transportation means include vehicles such as automobiles, motorcycles, and railway vehicles, airplanes, and ships. The present example embodiment will be described in detail below.

In the present example embodiment, the "nanocarbon dispersion liquid" comprises a nanocarbon material and a surfactant. A nanocarbon material contained in the nanocarbon dispersion liquid may be one kind or two or more kinds.

In the present example embodiment, nanocarbon materials refer to carbon materials mainly composed of carbon including single-walled carbon nanotubes, double-walled carbon nanotubes, multi-walled carbon nanotubes, carbon nanohorns, carbon nanotwists, graphene, fullerene, and the like. Hereinafter, a single-walled carbon nanotube will be described as one example of the nanocarbon material, but the present invention is not limited thereto.

<Single-Walled Carbon Nanotubes>

A single-walled carbon nanotube is tubular carbon material that has a single wall. As described above, it is known that the single-walled carbon nanotubes are classified into two different properties, i.e., metallic-type and semiconducting-type in accordance with a diameter and a winding manner of tubes. When single-walled carbon nanotubes are synthesized using known manufacturing methods, a mixed material of single-walled carbon nanotubes which comprise single-walled carbon nanotubes having metallic properties (hereinafter referred to as "metallic single-walled carbon nanotubes") and single-walled carbon nanotubes having semiconducting properties (hereinafter referred to as "semiconducting single-walled carbon nanotubes") in a statistical ratio of 1:2 is obtained.

In the present specification, single-walled carbon nanotubes in which metallic single-walled carbon nanotubes and semiconducting single-walled carbon nanotubes are mixed together are referred to as a "single-walled carbon nanotube mixture". The single-walled carbon nanotube in the present example embodiment may be composed of pure carbon, or substituted with any appropriate functional group in order to exhibit solubility of the single-walled carbon nanotube in an aqueous solvent or the like.

The single-walled carbon nanotube mixture may be separated into a dispersion liquid comprising a large amount of metallic single-walled carbon nanotubes (also referred to as a "dispersion liquid of metallic single-walled carbon nanotubes") and a dispersion liquid comprising a large amount of semiconducting single-walled carbon nanotubes (also referred to as a "dispersion liquid of semiconducting single-walled carbon nanotubes") by a separation step using an electric-field-induced layer formation method described later and the like. The dispersion liquid comprising a large amount of metallic single-walled carbon nanotubes is, for example, a dispersion liquid comprising more than 50% by mass, preferably 66% by mass or more of the metallic single-walled carbon nanotubes in the total weight of single-walled carbon nanotubes. The dispersion liquid comprising a large amount of semiconducting single-walled carbon nanotubes is, for example, a dispersion liquid comprising more than 50 mass %, preferably 66 mass % or more, more preferably 83% by mass or more of the semiconducting single-walled carbon nanotubes in the total weight of the single-walled carbon nanotubes. The separation tendency of the metallic-type and semiconducting-type single-walled carbon nanotubes can be analyzed by a microscopic Raman spectrum analysis method and an ultraviolet visible near-infrared absorption spectrophotometric analysis method.

In the present example embodiment, the "nanocarbon dispersion liquid" may be a dispersion liquid of a single-walled carbon nanotube mixture before the separation step, or may be a dispersion liquid of metallic single-walled carbon nanotubes or a dispersion liquid of semiconducting single-walled carbon nanotubes which are after separated. Unless explicitly stated, the description of "single-walled carbon nanotube dispersion liquid" is intended to include dispersion liquids of single-walled carbon nanotubes of all of these embodiments.

<Dispersion Liquid of Single-Walled Carbon Nanotube Mixture>

The dispersion liquid of the single-walled carbon nanotube mixture in the present example embodiment is a liquid in which the single-walled carbon nanotube mixture is dispersed in a dispersion medium comprising a surfactant. The single-walled carbon nanotube mixture is not particularly limited as long as it comprises a metallic single-walled carbon nanotube and a semiconducting single-walled carbon nanotube. That is, the single-walled carbon nanotube mixture may be synthesized by a known method for synthesizing single-walled carbon nanotubes, or the commercially available ones may be used.

The dispersion medium is not particularly limited as long as it can make the single-walled carbon nanotube mixture disperse therein. Examples of the dispersion medium include water, heavy water, organic solvents, ionic liquids, and the like. Among these dispersion media, water or heavy water is preferably used because the single-wall carbon nanotube sample does not deteriorate.

Examples of the surfactant include nonionic surfactants, cationic surfactants, anionic surfactants and the like. The use of a nonionic surfactant is preferable for preventing ionic impurities such as sodium ions from being mixed into the single-walled carbon nanotube.

The nonionic surfactant is not particularly limited, but examples thereof include a nonionic surfactant having a polyethylene glycol structure typified by polyoxyethylene alkyl ethers and a nonionic surfactant having a non-ionizing hydrophilic site and a hydrophobic site including as an alkyl chain, such as an alkyl glucoside-based nonionic surfactant. They may be used alone or in combination of two or more. As such a nonionic surfactant, polyoxyethylene alkyl ether represented by the following formula (1) is preferably used.

$$C_nH_{2n}(OCH_2CH_2)_mOH \tag{1}$$

wherein, n=12 to 18, m=10 to 100, preferably 20 to 100.

Examples of the polyoxyethylene alkyl ether represented by the above formula (1) include polyoxyethylene (23) lauryl ether (trade name: Brij L23, manufactured by Sigma-Aldrich), polyoxyethylene (20) cetyl ether (trade name: Brij C20, manufactured by Sigma-Aldrich), polyoxyethylene (20) stearyl ether (trade name: Brij S20, manufactured by Sigma-Aldrich), polyoxyethylene (10) oleyl ether (trade name: Brij O10, manufactured by Sigma-Aldrich), polyoxyethylene (10) cetyl ether (trade name: Brij C10, manufactured by Sigma-Aldrich), polyoxyethylene (10) stearyl ether (trade name: Brij S10, manufactured by Sigma-Aldrich), polyoxyethylene (20) oleyl ether (trade name: Brij O20, manufactured by Sigma-Aldrich), polyoxyethylene (100) stearyl ether (trade name: Brij S100, manufactured by Sigma-Aldrich), and the like.

Examples of the nonionic surfactant that may be used include polyoxyethylene sorbitan monostearate (molecular formula: $C_{64}H_{126}O_{26}$, trade name: Tween 60, manufactured by Sigma-Aldrich), polyoxyethylene sorbitan trioleate (molecular formula: $C_{24}H_{44}O_6$, trade name: Tween 85, manufactured by Sigma-Aldrich), octylphenol ethoxylate (molecular formula: $C_{14}H_{22}O\ (C_2H_4O)_n$, n=1 to 10, trade name: Triton X-100, manufactured by Sigma Aldrich), polyoxyethylene (40) isooctylphenyl ether (molecular formula: $C_8H_{17}C_6H_4O\ (CH_2CH_2O)_{40}H$, trade name: Triton X-405, manufactured by sigma-Aldrich), poloxamer (molecular formula: $C_5H_{10}O_2$, trade name: Pluronic, manufactured by Sigma-Aldrich), polyvinylpyrrolidone (molecular formula: $(C_6H_9NO)_n$, n=5 to 100, manufactured by Sigma-Aldrich) and the like.

These surfactants may be used alone or in combination of two or more.

When the single-walled carbon nanotube mixture is dispersed in the dispersion medium, the content of the surfactant is not particularly limited as long as the single-walled carbon nanotube mixture can be dispersed in the dispersion medium. The content of the surfactant in the dispersion liquid of the single-walled carbon nanotube mixture is, for example, the critical micelle concentration or more, preferably 50 times or more, more preferably 80 times or more of the critical micelle concentration, and the upper limit is, for example, 10 mass % or less, preferably 1000 times or less, more preferably 500 times or less, and further preferably 200 times or less of the critical micelle concentration. In the present specification, the critical micelle concentration (also abbreviated as "CMC") is determined as follows. For example, the surface tension is measured by using a surface tension meter, such as a Wilhelmy-type surface tension meter, with changing the concentration of the surfactant aqueous solution under a constant temperature, and the concentration of the inflection point is defined as the critical micelle concentration. In the present specification, the "critical micelle concentration" is a value at 25° C. under an atmospheric pressure.

When the single-walled carbon nanotube mixture is dispersed, it is preferable to introduce it into the dispersion medium so that the concentration of the single-walled carbon nanotube mixture is, for example, 100 μg/mL or more and 10 mg/mL or less. As described later, in the step of preparing a dispersion liquid of a single-walled carbon nanotube mixture, the undispersed single-walled carbon nanotubes may be separated and removed (purified) by ultracentrifugation or the like in some cases. The concentration of the single-walled carbon nanotube mixture in the dispersion medium after the purification is preferably, for example, 5 μg/mL or more and 1 mg/mL or less.

<Step of Preparing Dispersion Liquid of Single-Walled Carbon Nanotube Mixture>

It is preferable to prepare a dispersion liquid of the single-walled carbon nanotube mixture by dispersing the single-walled carbon nanotube mixture in a solution comprising a surfactant and a dispersion medium. The method for preparing the dispersion liquid of the single-walled carbon nanotube mixture is not particularly limited, and known methods can be applied. Examples thereof include a method of subjecting a mixed liquid of a single-walled carbon nanotube mixture and a dispersion medium comprising a surfactant to ultrasonic treatment to disperse the single-walled carbon nanotube mixture in the dispersion medium. In place of the ultrasonic treatment, a method of dispersing the single-walled carbon nanotube mixture in the dispersion medium by mechanical shear force may be employed. When the single-walled carbon nanotube mixture is dispersed, the concentration of the surfactant and the concentration of the single-walled carbon nanotube mixture are as described above.

In the single-walled carbon nanotube dispersion liquid, it is preferable that the metallic single-walled carbon nanotubes and the semiconducting single-walled carbon nanotubes contained in the single-walled carbon nanotube mixture are independently dispersed without being aggregated. Therefore, the metallic single-walled carbon nanotubes and the semiconducting single-walled carbon nanotubes that have not been dispersed by the ultrasonic treatment or the like are preferably separated and removed by ultracentrifugation.

<Separation Step>

In the present example embodiment, the nanocarbon dispersion liquid may be a dispersion liquid of semiconducting or metallic single-walled carbon nanotubes. The dispersion liquid of semiconducting or metallic single-walled carbon nanotubes may be obtained by separating the single-walled carbon nanotube mixture dispersion liquid in the separation step. As one example of the separation step for separating the single-walled carbon nanotube mixture in the dispersion liquid into the metallic single-walled carbon nanotubes and the semiconducting single-walled carbon nanotubes, a separation method by the electric-field-induced layer formation method will be described below.

(Separation of Semiconducting and Metallic Single-Walled Carbon Nanotubes by Electric-Field-Induced Layer Formation Method)

The electric-field-induced layer formation method is as follows. A dispersion liquid in which a single-walled carbon nanotube mixture is monodispersed by a surfactant is introduced into a container (separation tank), a direct-current voltage is applied between a pair of electrodes which are installed on the upper and lower surfaces inside the container so as to be in contact with the solution, and thus metallic and semiconducting single-walled carbon nanotubes are separated by a carrier-free electrophoresis method. The applied electric field is a direct current electric field or a direct current pulsed electric field. The applied voltage is determined to be an optimum value depending on the composition of the dispersion medium and the charge amount of the single-walled carbon nanotube mixture. When water or heavy water is used as the dispersion medium, the applied voltage which is applied between the electrodes is preferably more than 0 V and 1000 V or less, and particularly in the case of using water or heavy water, a voltage in the range of more than 0V and 300 V or less is preferable to suppress the effect of electrolysis.

When the dispersion liquid comprises a nonionic surfactant, the micelles containing metallic single-walled carbon nanotubes have a weak positive charge as a whole micelle in the solution, and the micelles containing semiconducting single-walled carbon nanotubes have a negative charge as a whole micelle. After the voltage is applied, the micelles containing the semiconducting single-walled carbon nanotubes tend to have a larger specific gravity than the micelles containing the metallic single-walled carbon nanotubes. As a result, in the container, a metallic single-walled carbon nanotube dispersion liquid layer is formed on the upper layer, and a semiconducting single-walled carbon nanotube dispersion liquid layer is formed on the lower layer, respectively. By collecting these layers, a dispersion liquid of metallic single-walled carbon nanotubes and a dispersion liquid of semiconducting single-walled carbon nanotubes can be obtained.

Examples of the separation apparatus that may be used include the apparatus used in Examples described later (a schematic view thereof is shown in FIG. 1). The separation tank in the separation apparatus is a part filled with the micelle dispersion solution comprising the single-walled carbon nanotubes and has a separation flow passage. The separation flow passage preferably comprises a flow passage formed in a longitudinal direction (also referred to as an upper and lower direction, or a vertical direction) in order to efficiently perform separation using both specific gravity and electric charge. In the present specification, regarding the definitions of the upper and lower direction, the lower direction means the downward direction with respect to gravity or inertial force, which is the direction that particles having large specific gravity move; and the upper direction means the upward direction with respect to the direction of gravity or inertial force, which is the direction that particles having small specific gravity move. The direction of the electric field is preferably upward, but it may be set in the opposite direction. The separation apparatus may be a batch type or a continuous type.

In the separation step, the concentration of the surfactant in the nanocarbon dispersion liquid to be introduced into the separation tank is not particularly limited, but is, for example, a critical micelle concentration or more, preferably 80 times or more, more preferably 100 times or more of the critical micelle concentration, and the upper limit thereof is, for example, 10 mass % or less, preferably 1000 times or less, more preferably 500 times or less, and further preferably 300 times or less of the critical micelle concentration. If the concentration of the surfactant is too low, it may be difficult to stably disperse the single-walled carbon nanotubes in the solution during the separation step. If the concentration of the surfactant is too high, efficient separation may be inhibited. As the possible causes thereof, it is considered that the viscosity of the dispersion liquid becomes high, and significant difference in mobility is not present between the micelle containing the metallic single-walled carbon nanotubes and the micelle containing the semiconducting single-walled carbon nanotubes.

As a method of adjusting the surfactant concentration to the above range, the surfactant concentration may be adjusted at the time of preparing the dispersion liquid; or alternatively after performing a dispersing operation at an arbitrary surfactant concentration suitable for dispersing the single-walled carbon nanotube mixture in advance, the surfactant concentration may be adjusted to the above range by mixing with a solution in which only the surfactant is dissolved (hereinafter, also referred to as an adjustment solution). In the case of performing ultracentrifugation purification, since the concentration of the surfactant slightly changes before and after the purification, adjusting the surfactant concentration by the latter method is preferable, but it is not particularly limited thereto.

The concentration of the single-walled carbon nanotube mixture in the dispersion liquid of the single-walled carbon nanotube mixture to be introduced into the separation tank is not particularly limited, but is, for example, preferably 1 mg/mL or less, and more preferably 1 µg/mL or more and 100 µg/mL or less, further preferably 5 µg/mL or more and 40 µg/mL or less. When the concentration of the single-walled carbon nanotube mixture is within the above range, it is possible to separate into metallic and semiconducting carbon nanotubes in a separation step by a carrier-free electrophoresis method or the like.

For the method of separating the single-walled carbon nanotubes by the electric-field-induced layer formation method, for example, Patent Document 1 may be referred.

<Storage Method>

In the present example embodiment, the method for storing the above-mentioned nanocarbon dispersion liquid (the dispersion liquid of the single-walled carbon nanotube mixture before the separation step, the dispersion liquid of the metallic or semiconducting single-walled carbon nanotubes after the separation step, and the like) comprises a low-temperature storage step and/or a surfactant concentration adjustment step. As a result, the dispersion liquid can be stored in a stable state without generating white turbidity even when it is stored for a long period of time. Further, although the dispersion liquid containing the single-walled carbon nanotubes had a problem that the electric conductivity easily increases when it is stored at room temperature for a long time, the storage method of the present example embodiment can suppress the increase in the electric conductivity. The details will be described below.

(Low-Temperature Storage Step)

As one aspect of the storage method of the nanocarbon dispersion liquid of the present example embodiment, it is preferable to comprise a step of storing the nanocarbon dispersion liquid at 10° C. or lower (also referred to as "low-temperature storage step"). In the storage step, it is desirable that the gas in the storage container is hermetically sealed so as not to be exchanged with the outside gas. The gas in the storage container may be sealed with an inert atmosphere such as nitrogen, argon or helium. Since the nanocarbon dispersion liquid is significantly easy to generate white turbidity under the condition of higher than 10° C., it is preferably stored at a temperature of 10° C. or lower, more preferably less than 10° C., further preferably 8° C. or lower, still more further preferably 7° C. or lower, particularly preferably 5° C. or lower. The lower limit of the storage temperature is preferably higher than the temperature at which the nanocarbon dispersion liquid freezes, for example, preferably −5° C. or higher, and more preferably 0° C. or higher. In the low-temperature storage step, under a temperature condition of 10° C. or lower, the nanocarbon dispersion liquid may be placed in stationary or may be transported. The low-temperature storage step may be continuous or repeated a plurality of times.

(Surfactant Concentration Adjustment Step)

As one aspect of the storage method of the nanocarbon dispersion liquid of the present example embodiment, it is preferable to comprise a step of adjusting the concentration of the surfactant in the nanocarbon dispersion liquid (also referred to as "surfactant concentration adjustment step"). As a method for adjusting the concentration of the surfactant contained in the nanocarbon dispersion liquid, for example, a dialysis method is preferably used. By using the dialysis method, the surfactant can be removed and the surfactant content can be reduced. The molecular weight cut off of the dialysis membrane used is, for example, preferably 30 kD to 2000 kD, more preferably 500 kD to 1000 kD. A hollow fiber type dialysis module may be also used. In the surfactant concentration adjustment step, the concentration of the surfactant in the nanocarbon dispersion liquid is preferably less than 100 times, more preferably 80 times or less, further preferably 70 times or less, further more preferably 50 times or less of the critical micelle concentration, and the lower limit thereof is preferably adjusted to be the critical micelle concentration or more, more preferably 8 or more times, and further preferably 10 times or more of the critical micelle concentration. Adjusting the concentration of the surfactant in the nanocarbon dispersion liquid within the above range is less likely to occur white turbidity even after long-term storage.

The method for storing the nanocarbon dispersion liquid of the present example embodiment may comprise a step of transporting the nanocarbon dispersion liquid obtained after the surfactant concentration adjustment step. The temperature at the time of transportation is not particularly limited, but is preferably 0° C. to 30° C., more preferably 0° C. to 20° C., and it is further preferable that the transportation is performed under a temperature environment of 0° C. to 10° C. as in the low-temperature transportation step described later.

It is not clear why the nanocarbon dispersion liquid is easily to generate white turbidity when it is stored at a room temperature for a long time without adjusting the concentration of the surfactant, but the following reasons are assumed. The surfactant in the nanocarbon dispersion liquid exists as a micelle having a minute charge. However, since the dispersion is usually performed at a concentration higher than the critical micelle concentration, bond of micelles or the like is formed in the solution at a room temperature (about 15 to 30° C.). Further, it is inferred that the nanocarbon dispersion liquid obtained by using the electric-field-induced layer formation method in the separation step comprises cleaved surfactant molecules and they become a precipitation source of the surfactant in the solution, which easily generates white turbidity.

As one aspect of the method for storing the nanocarbon dispersion liquid of the present example embodiment, it is preferable to comprise both the surfactant concentration adjustment step and the low-temperature storage step. The order of these steps is not particularly limited, but it is preferable to perform the surfactant concentration adjustment step and then perform the low-temperature storage step.

In the method for storing the nanocarbon dispersion liquid of the present example embodiment, one example of preferable embodiment of the storage temperature and the concentration of the surfactant will be described below.

In the case of storing the nanocarbon dispersion liquid under a temperature condition of 0° C. to 10° C., when the concentration of the surfactant in the nanocarbon dispersion liquid is preferably 10 times or more and less than 100 times of the critical micelle concentration, the nanocarbon dispersion liquid can be stably stored for about 6 months or more;

when the concentration of the surfactant in the nanocarbon dispersion liquid is more preferably 10 times or more and 80 times or less of the critical micelle concentration, the nanocarbon dispersion liquid can be stably stored for about 9 months or more;

when the concentration of the surfactant in the nanocarbon dispersion liquid is further preferably 10 times or more and 50 times or less of the critical micelle concentration, the nanocarbon dispersion liquid can be stably stored for about 1 year or more.

In the case of storing the nanocarbon dispersion liquid under a temperature condition of 0° C. to 8° C., when the concentration of the surfactant in the nanocarbon dispersion liquid is preferably about 10 times or more and 80 times or less of the critical micelle concentration, the nanocarbon dispersion liquid can be stably stored for about one year or more.

In the case of storing the nanocarbon dispersion liquid under a temperature condition of 0° C. to 5° C., when the concentration of the surfactant in the nanocarbon dispersion liquid is preferably about 10 times or more and 100 times or less of the critical micelle concentration, the nanocarbon dispersion liquid can be stably stored for one year or more.

The low-temperature storage step in the method for storing the nanocarbon dispersion liquid of the present example embodiment may comprise a low-temperature transportation step of transporting the nanocarbon dispersion liquid. The nanocarbon dispersion liquid used in the low-temperature transportation step is not particularly limited, but is preferably the nanocarbon dispersion liquid obtained after the above-mentioned surfactant concentration adjustment step. In the transportation step, the nanocarbon dispersion liquid is transported under a temperature environment of preferably 0° C. to 10° C., more preferably 0° C. to 8° C. A transportation means in the low-temperature transportation step is preferably used. Examples of the transportation means include vehicles such as automobiles, motorcycles, and railway vehicles, airplanes, ships, and the like, and these transportation means are preferably equipped with a refrigerating device. The low-temperature transportation step may be performed by using a refrigerant, a cooler box or the like. The low-temperature transportation step may comprise, if necessary, a step of interrupting transportation by a transportation means or the like and a step of performing the storage in a refrigerating storage place such as a refrigerating warehouse. In the refrigerating storage place, it is preferable to store the nanocarbon dispersion liquid in a temperature environment of preferably 0° C. to 10° C., more preferably 0° C. to 8° C. The transportation step may comprise the step of transporting the nanocarbon dispersion liquid by a transportation means plural times, and may comprise the step of storing the nanocarbon dispersion liquid in a refrigerating storage place plural times. In the transportation step, the nanocarbon dispersion liquid is preferably stored in a hermetically sealed container, and the hermetically sealed container may be further housed in a packaging container such as cardboard. Examples of the transportation step include a method of delivery using Cool TA-Q-BIN (registered trademark) by Yamato Transport Co., Ltd., Hikyaku Cool Express (registered trademark) by Sagawa Express Co., Ltd., Chilled Yu-Pack (registered trademark) by Japan Post, or the like.

The storage method of the present example embodiment may be also applied as a method capable of storing a dispersion liquid comprising a nanocarbon material other than the single-walled carbon nanotubes in a stable state for a long period of time.

EXAMPLES

Hereinafter, an embodiment of the present invention will be explained in details by using examples, but the present invention is not limited to these examples.

[Dispersion Liquid A] (Separation Step: None, Surfactant Adjustment Step: None)
(Preparation of Dispersion Liquid of Single-Walled Carbon Nanotube Mixture)

A single-walled carbon nanotube mixture having an average diameter of 1 nm was heated at 800° C. for 2 hours in vacuum.

1.0% by mass of polyoxyethylene (100) stearyl ether (trade name: Brij S100, manufactured by Sigma-Aldrich), which is a nonionic surfactant, was dissolved in water as a dispersion medium to prepare solution A (having about 100 times of the critical micelle concentration). The heated single-walled carbon nanotube mixture was weighed so that the content thereof in the dispersion liquid of single-walled carbon nanotube mixture was 0.3 µg/mL, and was added to the solution A.

The solution A in which the mixture of single-walled carbon nanotubes was dispersed was subjected to ultrasonic dispersion treatment using a horn-type ultrasonic homogenizer (trade name: Digital Sonifier 450, manufactured by Branson) with an output of 25 W for 120 minutes. Then, the ultracentrifugation operation was performed with an ultracentrifuge (trade name: CS100GX, manufactured by Hitachi Koki Co., Ltd.) at 250,000×g and 10° C. for 50 minutes. As a result, 80% of the supernatant was obtained as a dispersion liquid (dispersion liquid A) in which the single-walled carbon nanotube mixture was monodispersed.

The obtained dispersion liquid A was stored for 6 months under each temperature condition of 0° C., 5° C., 10° C. and 20° C. The results are shown in Table 1. In Table 1, the nanocarbon dispersion liquid was visually observed, and those in which no white turbidity was observed were described as ○, and those in which white turbidity was observed were described as x. For the dispersion liquid A stored at each temperature, the sample stored at 20° C. for 3 months or more and the sample stored at 10° C. for 6 months generated white turbidity, respectively.

[Dispersion Liquid A'] (Separation Step: None, Surfactant Adjustment Step: Present)

Subsequently, the nonionic surfactant contained in the dispersion liquid A of the single-walled carbon nanotube mixture was removed by a dialysis method, and the content (mass) of the nonionic surfactant was lowered to ¹/₁₀ (0.1% by mass, which is about 10 times of the critical micelle concentration) to obtain dispersion liquid A'. The dialysis membrane used in the dialysis method was a hollow fiber filter (permeation molecular size; 750 kD) manufactured by Spectrum Lab.

The obtained dispersion liquid A' was stored for 6 months under the each temperature condition of 0° C., 5° C., 10° C. and 20° C., and as a result, no white turbidity was observed (Table 1).

[Dispersion Liquids B and C] (Separation Step: Present, Surfactant Adjustment Step: None)
(Separation of Dispersion Liquid of Single-Walled Carbon Nanotube Mixture)

35 mL of the above dispersion liquid A and 35 mL of 1% by mass polyoxyethylene (100) stearyl ether aqueous solution were mixed to make the total volume 70 mL, and thereby the single-walled carbon nanotube mixture was diluted to prepare the dispersion liquid of the single-walled carbon nanotube mixture.

Subsequently, the prepared dispersion liquid of the single-walled carbon nanotube mixture was used to perform a separation step by an electric-field-induced layer formation method. FIG. 1 shows the schematic view of the separation apparatus used. Into an electrophoresis tank (also referred to as "separation tank") 301 of the separation apparatus 300 shown in FIG. 1, from the lower injection port, 7 mL of water, 70 mL of the single-walled carbon nanotube dispersion liquid prepared above, and 15 mL of a 2% by mass polyoxyethylene (100) stearyl ether aqueous solution were gently injected in order to form the liquid layers so that they were lined up in the order of injection.

Platinum electrodes were arranged on the upper end of the water layer (layer a) 304 and the lower end of the 2 mass % of polyoxyethylene (100) stearyl ether aqueous solution layer (layer b) 306. The platinum electrode arranged at the upper end of the layer a was used as the cathode 302, and the platinum electrode arranged at the lower end of the layer b was used as the anode 303. The distance between the cathode 302 and the anode 303 was about 20 cm.

Next, a voltage of 200 V was continuously applied between the cathode 302 and the anode 303 for 72 hours. After 72 hours of voltage application, it was found that the solution in the separation tank was separated into three layers (in order from the top, a layer containing a large amount of metallic single-walled carbon nanotubes, a transparent layer, and a layer containing a large amount of semiconducting single-walled carbon nanotubes). After 72 hours, about 7 mL of the liquid each was fractionated from the bottom of the electrophoresis tank 301, and the dispersion liquid of single-walled carbon nanotubes were collected from the lowermost layer (the first fraction) and the eleventh layer from the lowermost layer (the eleventh fraction), and the contents thereof were evaluated by spectroscopic evaluation. As a result, the lowermost layer (the first fraction) was referred to as a dispersion liquid of semiconducting single-wall carbon nanotubes (dispersion liquid B), and the eleventh layer from the bottom layer (the eleventh fraction) was referred to as a dispersion liquid of metallic single-walled carbon nanotubes (dispersion liquid C). The concentration of the surfactant in the dispersion B was 2% by mass, and the concentration of the surfactant in the dispersion C was 0.8% by mass. The single-walled carbon nanotube mixture was separated at a room temperature (about 21° C.).

The obtained dispersion liquid B was stored under each temperature condition of 0° C., 5° C., 10° C. and 20° C. The samples respectively stored at 10° C. and 20° C. for 3 months and 6 months generated white turbidities (Table 1).

The obtained dispersion liquid C was stored under each temperature condition of 0° C., 5° C., 10° C. and 20° C. The sample stored at 20° C. for 3 months and the samples stored at 10° C. and 20° C. for 6 months respectively generated white turbidity (Table 1).

[Dispersion Liquid B' and Dispersion Liquid C'] (Separation Step: Present, Surfactant Adjustment Step: Present)

The dispersion liquid B and the dispersion liquid C are respectively subjected to a dialysis method to remove the nonionic surfactant contained in the single-walled carbon nanotube dispersion liquid, and the content of the nonionic surfactant is lowered to 1/10 of the content thereof in the dispersion liquid A (i.e. 0.1% by mass, which is about 10 times of the critical micelle concentration) to prepare dispersion liquid B' and dispersion liquid C'. The dialysis membrane used in the dialysis method was a hollow fiber filter (permeation molecular size; 750 kD) manufactured by Spectrum Lab.

The dispersion liquids B' and C' were stored for 6 months under the respective temperature conditions of 0° C., 5° C., 10° C. and 20° C. For the dispersion liquid B', white turbidity was observed at 20° C. for 3 months. On the other hand, the dispersion liquid C' did not generate white turbidity for 6 months (Table 1).

Figure 2:
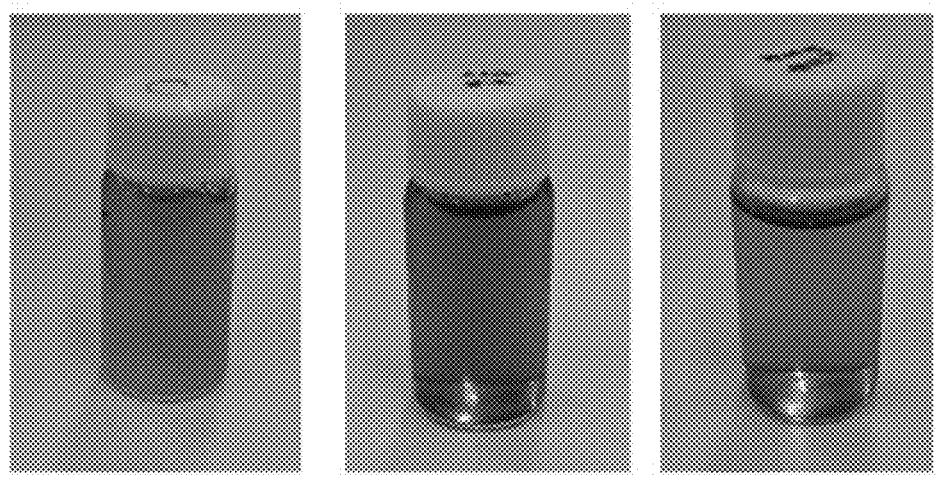
FIG. 2 is a photograph showing one example of a nanocarbon dispersion liquid that was subjected to a storage experiment in the Example.

Table 1 shows the state of white turbidity when the above dispersion liquids were respectively subjected to the temperature conditions of 0° C., 5° C., 10° C. and 20° C. FIG. 2 is a photograph of each dispersion liquid, and from the left, the dispersion liquid B after being stored at 20° C. for 6 months, the dispersion liquid B after being stored at 5° C. for 6 months, and the dispersion liquid C after being stored at 5° C. for 6 months are shown. It was observed that the sample in which the dispersion liquid B was stored at 20° C. for 6 months generated much white turbidity as compared with the other samples.

TABLE 1

| Dispersion liquid | existence of separation step | existence of surfactant concentration adjustment step | Storage period at the time of starting | | | | 3 months | | | | 6 months | | | |
|---|---|---|---|---|---|---|---|---|---|---|---|---|---|---|
| | | | 0° C. | 5° C. | 10° C. | 20° C. | 0° C. | 5° C. | 10° C. | 20° C. | 0° C. | 5° C. | 10° C. | 20° C. |
| Dispersion liquid A | none | none | o | o | o | o | o | o | o | x | o | o | x | x |
| Dispersion liquid B | present (semiconducting) | none | o | o | o | o | o | o | x | x | o | o | x | x |
| Dispersion liquid C | present (metallic) | none | o | o | o | o | o | o | o | x | o | o | x | x |
| Dispersion liquid A' | none | present | o | o | o | o | o | o | o | o | o | o | o | o |
| Dispersion liquid B' | present (semiconducting) | present | o | o | o | o | o | o | o | x | o | o | o | x |
| Dispersion liquid C' | present (metallic) | present | o | o | o | o | o | o | o | o | o | o | o | o |

From the results of the storage experiment of each dispersion liquid described above, it was shown that the step of reducing the concentration of the surfactant and/or the step of storing the dispersion liquid at a low temperature allows the nanocarbon dispersion liquid to be stable without generating white turbidity even when the nanocarbon dispersion liquid is stored for a long period.

For each of the dispersion liquids A, B, C, A', B', and C', the electrical conductivity of the dispersion liquid without generating white turbidity is 10 μS/cm or more and 200 μS/cm or less, and the electrical conductivity of the dispersion liquid with generating white turbidity is more than 200 μS/cm. The electric conductivity was measured with a conductivity meter ES-71 manufactured by Horiba Ltd.

The whole or part of the example embodiments disclosed above can be described as, but not limited to, the following supplementary notes.

(Supplementary Note 1)

A method for storing a nanocarbon dispersion liquid comprising a nanocarbon material and a surfactant, comprising a low-temperature storage step of storing the nanocarbon dispersion liquid at 10° C. or lower.

(Supplementary Note 2)

A method for storing a nanocarbon dispersion liquid comprising a nanocarbon material and a surfactant, comprising a surfactant concentration adjustment step of adjusting a concentration of the surfactant in the nanocarbon dispersion liquid so as to be less than 100 times of a critical micelle concentration and equal to or more than the critical micelle concentration.

(Supplementary Note 3)

The method for storing a nanocarbon dispersion liquid according to the supplementary note 1, further comprising a surfactant concentration adjustment step of adjusting a concentration of the surfactant in the nanocarbon dispersion liquid so as to be less than 100 times of a critical micelle concentration and equal to or more than the critical micelle concentration.

(Supplementary Note 4)

The method for storing a nanocarbon dispersion liquid according to the supplementary note 1 or 3, wherein the nanocarbon dispersion liquid is stored at 8° C. or less in the low-temperature storage step.

(Supplementary Note 5)

The method for storing a nanocarbon dispersion liquid according to any one of the supplementary notes 1 to 4, wherein the surfactant is a nonionic surfactant.

(Supplementary Note 6)

The method for storing a nanocarbon dispersion liquid according to any one of the supplementary notes 1 to 5, wherein the nanocarbon dispersion liquid is produced by a method comprising a step of applying a direct current voltage to a surfactant solution in which the nanocarbon is dispersed.

(Supplementary Note 7)

The method for storing a nanocarbon dispersion liquid according to any one of the supplementary notes 1 to 6, wherein the nanocarbon dispersion liquid is a dispersion liquid of single-walled carbon nanotubes.

(Supplementary Note 8)

The method for storing a nanocarbon dispersion liquid according to any one of the supplementary notes 1 to 7, wherein the low-temperature storage step comprises a low-temperature transportation step of transporting the nanocarbon dispersion liquid.

(Supplementary Note 9)

The method for storing a nanocarbon dispersion liquid according to the supplementary note 8, wherein the low-temperature transportation step comprises a step of transporting the nanocarbon dispersion liquid by a transportation means equipped with a refrigerating device.

(Supplementary Note 10)

The method for storing a nanocarbon dispersion liquid according to the supplementary note 8 or 9, wherein the low-temperature transportation step comprises a step of storing the nanocarbon dispersion liquid in a refrigerating storage place.

(Supplementary Note 11)

A method for producing a nanocarbon dispersion liquid, comprising a low-temperature storage step of storing a first nanocarbon dispersion liquid comprising a nanocarbon material and a surfactant at 10° C. or lower. Here, "a first nanocarbon dispersion liquid" refers to the nanocarbon dispersion liquid before being subjected to the low-temperature storage step. The concentration of the surfactant in a first nanocarbon dispersion liquid is not particularly limited, but it is preferably equal to or more than the critical micelle concentration and less than 100 times of the critical micelle concentration.

INDUSTRIAL APPLICABILITY

The method for storing a nanocarbon dispersion liquid of the present invention can be used in various industrial fields utilizing the mechanical properties, electrical properties, and chemical properties of nanocarbon materials. For example, it can be used for storage of the nanocarbon dispersion liquid which is used in the production of a semiconductor film in the field of semiconductor devices, storage of a printing ink of the nanocarbon dispersion liquid which is used in the production of electronic parts, and the like.

The invention claimed is:

1. A method for storing a nanocarbon dispersion liquid comprising a nanocarbon material and a surfactant, the method comprising:
   adjusting a concentration of the surfactant in the nanocarbon dispersion liquid so as to be 50 times or less of a critical micelle concentration and equal to or more than the critical micelle concentration, and
   storing the nanocarbon dispersion liquid obtained by adjusting a concentration of the surfactant in the nanocarbon dispersion liquid at 10° C. or lower,
   wherein a concentration of the surfactant in the nanocarbon dispersion liquid before adjusting a concentration of the surfactant is 80 times or more of the critical micelle concentration.

2. The method for storing a nanocarbon dispersion according to claim 1, wherein the nanocarbon dispersion liquid is stored at 8° C. or less.

3. The method for storing a nanocarbon dispersion liquid according to claim 1, wherein the surfactant is a nonionic surfactant.

4. The method for storing a nanocarbon dispersion liquid according to claim 1, wherein the nanocarbon dispersion liquid is produced by applying a direct current voltage to a surfactant solution in which the nanocarbon is dispersed.

5. The method for storing a nanocarbon dispersion liquid according to claim 1, wherein the nanocarbon dispersion liquid is a dispersion liquid of single-walled carbon nanotubes.

6. The method for storing a nanocarbon dispersion liquid according to claim 1, comprising storing the nanocarbon dispersion liquid at 10° C. or lower while transporting the nanocarbon dispersion liquid.

7. The method for storing a nanocarbon dispersion liquid according to claim 6, comprising transporting the nanocarbon dispersion liquid while cooling the nanocarbon dispersion liquid.

8. A method for storing a nanocarbon dispersion liquid comprising a nanocarbon material and a surfactant, the method comprising:
   adjusting a concentration of the surfactant in the nanocarbon dispersion liquid so as to be 50 times or less of a critical micelle concentration and equal to or more than the critical micelle concentration, and
   storing the nanocarbon dispersion liquid obtained by adjusting a concentration of the surfactant in the nanocarbon dispersion liquid at 10° C. or lower for 3 months or more.

9. A method for storing a nanocarbon dispersion liquid comprising a nanocarbon material and a surfactant, the method comprising:
   adjusting a concentration of the surfactant in the nanocarbon dispersion liquid so as to be 50 times or less of a critical micelle concentration and equal to or more than the critical micelle concentration, and
   storing the nanocarbon dispersion liquid obtained by adjusting a concentration of the surfactant in the nanocarbon dispersion liquid at 10° C. or lower in a storage container which is hermetically sealed.

10. The method for storing a nanocarbon dispersion liquid according to claim 9, wherein a gas in the storage container is inert gas.

* * * * *